United States Patent [19]
Wirth et al.

[11] Patent Number: 5,727,520
[45] Date of Patent: Mar. 17, 1998

[54] FOUR-STROKE INTERNAL COMBUSTION ENGINE WITH SPARK IGNITION

[75] Inventors: Martin Wirth, Mayersdorf; Walter Piock, Niederberg; Frank Mundorff, Freiheitsplatz, all of Austria

[73] Assignee: AVL List GmbH, Graz, Austria

[21] Appl. No.: 829,342

[22] Filed: Mar. 31, 1997

[30] Foreign Application Priority Data

| Apr. 1, 1996 | [AT] | Austria | GM181/96 |
| Oct. 11, 1996 | [AT] | Austria | GM594/96 |

[51] Int. Cl.⁶ .................. F02F 3/28; F02B 31/04
[52] U.S. Cl. ............ 123/305; 123/307; 123/309; 123/301; 123/302
[58] Field of Search .................. 123/305, 260, 123/276, 307, 308, 309, 661, 301, 302

[56] References Cited

U.S. PATENT DOCUMENTS

| 5,115,774 | 5/1992 | Nomura et al. | 123/276 |
| 5,622,150 | 4/1997 | Fraidl et al. | 123/307 |
| 5,642,706 | 7/1997 | Wirth et al. | 123/305 |

FOREIGN PATENT DOCUMENTS

| 0558072 | 9/1993 | European Pat. Off. |
| 0639703 | 2/1995 | European Pat. Off. |

OTHER PUBLICATIONS

SAE Paper No. 940188 by Lawrence W. Evers, "Characterization of the Transient Spray from a High Pressure Swirl Injector."

Primary Examiner—Willis R. Wolfe
Assistant Examiner—Hieu T. Vo
Attorney, Agent, or Firm—Watson Cole Stevens Davis, P.L.L.C.

[57] ABSTRACT

In order to optimize combustion in a four-stroke spark-ignition engine with direct fuel injection, the conditions of charge flow are improved by providing the top surface of each piston with an essentially U-shaped guiding rib, which is open towards the exhaust side of the combustion chamber, fuel injection taking place into the concave area inside the guiding rib. The nozzle opening of the fuel injection device as well as the ignition source are positioned in the area of the cylinder center, i.e., preferably on different sides of the longitudinal center plane of the engine.

18 Claims, 2 Drawing Sheets

FOUR-STROKE INTERNAL COMBUSTION ENGINE WITH SPARK IGNITION

BACKGROUND OF THE INVENTION

The present invention relates to a four-stroke internal combustion engine with spark ignition and an injection device located in the cylinder head for direct injection of the fuel into the combustion chamber, with a reciprocating piston for each cylinder and a roof-shaped top of the combustion chamber with two or more intake valves, as well as intake ports generating a tumble flow in the combustion chamber and arranged on one side of the longitudinal center plane of the engine defined by the axes of crankshaft and cylinder, and an ignition source located in the area of the cylinder center.

DESCRIPTION OF THE PRIOR ART

Ever stricter demands concerning the reduction of fuel consumption and exhaust emissions, in particular hydrocarbon and nitrogen oxide emissions, necessitate the use of new technologies in internal combustion engines, above all in engines of the spark-ignition type that are predominant in the automobile industry.

One of the main reasons why the specific fuel consumption of a spark-ignition engine is higher than that of a diesel engine, is that the spark-ignition engine operates on a premixed, homogeneous fuel-air mixture. This requires control of the engine load by means of a throttling element limiting the total intake of fuel-air mixture (regulation by quantity).

Throttling the intake flow leads to a thermodynamic loss, which will increase fuel consumption of the engine. If such throttling is avoided, potential fuel savings amount to an estimated 25 percent.

Full use of the fuel saving potential is made possible by direct fuel injection and largely unthrottled engine operation, such that a spark-ignition engine may be operated in a manner similar to a diesel engine, using regulation by quality, i.e., control of the engine load by variation of the fuel-air ratio.

This mode of operation demands specific measures to safeguard complete and stable combustion even with a very high proportion of air in the mixture (low engine load), i.e., when a homogeneous fuel-air mixture is no longer ignitible.

This problem is commonly solved by providing for a strongly stratified, i.e., inhomogeneous, distribution of the mixture, which may be advantageously attained in the instance of direct fuel injection by injecting the fuel just before ignition takes place.

The mixture stratification thus generated by direct fuel injection must be stabilized by the main flow structures in the cylinder space of the internal combustion engine and by the geometry of the combustion chamber, in order to outlast the time-span between the end of injection and the beginning of ignition, even in the presence of the typically high turbulence levels of the internal flow. Main flow forms in this context are swirl and tumble movements. In the instance of a swirl movement the cylinder charge rotates about the cylinder axis due to the specific design of the intake passage, whereas a tumble flow is characterized by the charge rotating about an axis parallel to the crankshaft.

An intake-generated tumble vortex exhibits accelerated rotation due to a reduction of the cross-sectional area during compression. In the final phase of compression strong disintegration of the tumble vortex into smaller, stochastically distributed vortices may be observed if the valve angle (of a typical four-valve combustion chamber) is sufficiently flat. A tumble flow may be generated in the cylinder space of a modern, multivalve, spark-ignition engine with 2 or 3 intake valves without risking significant reductions in the flow coefficients of the intake ports. As a consequence, tumble flows are frequently used flow designs for spark-ignition engines in which the combustion characteristics are to be improved by means of increased charge movement.

For delivery of the fuel into the combustion chamber as required here under the above flow conditions the principle of a suitable injection valve is described in SAE Paper 940188, which produces a cone-shaped injection jet with excellent fuel atomization. By changing the fuel pressure and the counterpressure in the combustion chamber the cone angle of the injection jet may be influenced. A typical property of such injection nozzles is the improvement of atomization quality with rising injection pressure. This desired dependence will lead to increasing velocities of the injection jet of up to 100 m/s, however, accompanied by a high momentum of the fuel spray entering the combustion chamber. By contrast, the air flow in the combustion chamber, even in the presence of strong intake-generated swirl or tumble movements, exhibits a far smaller momentum (not more than 30–40 m/s), such that the injection jet in a first phase of entrance into the combustion chamber is only slightly influenced by the flow movements prevailing therein.

In view of the above considerations the main task to be accomplished is to transform the injection jet into a locally concentrated fuel-air spraycloud near the ignition source, and to further mix the mixture inside this cloud with the air in the combustion chamber. In this context the following points are essential:

The fuel-air spray must maintain its compact shape, especially at low engine loads, and should possibly be kept in the center of the combustion chamber, for thermodynamical reasons and in order to reduce the emissions of unburnt hydrocarbons.

Evaporation of the injected fuel and its mixing with the air in the combustion chamber to a preferably stoichiometric air ratio must be effected in the comparatively short time span between injection and ignition.

In developing a suitable combustion process for a spark-ignition engine with direct fuel injection, the particular dimensions of the combustion chamber must be taken into account as well as the characteristics of injection jet propagation. In an automobile engine of the spark-ignition type typical volumes of the individual cylinders lead to bore diameters of 60–100 mm, the piston lift approximately being in the same order of magnitude.

In view of the above propagation velocities of the injection jet at least part of the fuel spray must be expected to hit the surface of the piston. For this reason the design of the flow movements inside the combustion chamber should take into account this wetting of the walls.

In shaping the spraycloud and preparing the fuel-air mixture the following effects may be utilized:

generation of a conical fuel jet with variable cone angle dependent on the counterpressure in the combustion chamber, high injection pressure to improve atomization, thus accelerating direct evaporation of the fuel spray before it reaches the wall, generation of a raised turbulence level in the area of the injection jet by means of the flow movements inside the combustion chamber, acceleration of wall film evaporation by generating a high flow velocity in the wetted area of the piston surface.

EP 0 558 072 A1 is concerned with an embodiment of an internal combustion engine as discussed above, in which the intake ports are shaped and arranged such that a reverse tumble movement of the flow inside the combustion chamber is generated. This movement is amplified by adding a ramp-shaped projection to the surface of the piston. The piston surface also serves to deflect the injection jet towards the spark plug which is located in the cylinder center. In this way the injection jet and the flow in the combustion chamber pass along the piston surface in the same direction. The injection jet, or rather, the fuel-air spray into which the jet is transformed after its deflection at the piston, is permitted to propagate in all directions almost unimpeded, however, after having reached the cylinder head wall in the vicinity of the spark plug. No efforts are made at compacting the spraycloud after its deflection at the piston. Furthermore, the ramp-shaped projection on the piston surface produces a compression face underneath the exhaust valves. As a consequence, an additional, desirable, flow movement is created during engine compression just before the upper dead center, which is reversed, however, on the return move, thus tearing apart the compact mixture built up during the compression stroke.

Another variant of an internal combustion engine with direct fuel injection in presented in EP 0 639 703 A1, in which the intake ports are shaped such that a swirl flow is generated in the cylinder space. The piston surface has a clearly defined recess surrounded by a compression face, the recess being positioned eccentrically such that the spark plug in the center of the combustion chamber and the radially positioned injection valve are located at the edge of the recess. Fuel injection is directed towards the edge of the recess which is specifically designed for this purpose. In this instance the surface of the piston is primarily employed for atomization of the fuel jet. The task of the swirl flow is to push the atomized fuel rebounding from the edge of the recess towards the spark plug.

In the known variants referred to above the injection device is positioned at a comparatively large distance from the ignition source, which will have adverse effects on ignition reliability and combustion stability.

SUMMARY OF THE INVENTION

It is an object of this invention to avoid the above drawbacks and to design a combustion process under the above conditions with intake-generated tumble flow in the cylinder space, whereby great ignition reliability and combustion stability are to be attained.

This task is accomplished by providing the piston on its top surface next to the combustion chamber with a flow guiding rib which is essentially U-shaped in plan view, the "U" opening towards the exhaust side of the combustion chamber, and the top face of the piston assuming a continuously curved, concave shape between the guiding rib and the outer edge of the piston, and fuel injection taking place into a concave area inside the "U", and the nozzle opening of the fuel injection device being positioned in the area of the longitudinal center plane of the engine.

The design of the piston surface is of particular significance for maintaining the tumble flow and forming the fuel-air spraycloud. Configuring the piston top in accordance with the invention will assist at forming a basic tumble flow during the suction phase and guide the fuel-air stream so as to minimize cyclical fluctuations in mixture distribution. By placing the injection device in close vicinity of the ignition source, high ignition reliability and combustion stability are achieved. The position of the ignition source and injection device in the center of the combustion chamber is thermodynamically advantageous. Although placing the injection device next to the ignition source will slightly reduce valve diameters and thus entail small performance losses, these losses are compensated by the fact that direct fuel injection into the cylinder space cools down the mixture due to fuel evaporation, which will increase density and lead to charge improvement. Careful optimization of the design of the cylinder head will lead to reductions in valve diameters of 7 to 8 percent.

To further increase the tumble flow occurring during the compression phase it may be provided that the top face of the piston lies partly below a reference plane through the outer edge of the piston, i.e., on the crankshaft side of this plane.

To ensure flow separation of the air flow moving across the guiding rib, the guiding rib is advantageously provided with a rounded upper edge, whose curved part smoothly joins with the concave top face of the piston, the radius of the curved part of the guiding rib preferably amounting to 1 to 3 mm, and preferably assuming its smallest value in the area of a cylinder center plane normal to the crankshaft axis. Best results have been obtained if the largest distance between guiding rib and longitudinal center plane, as measured normally to the latter, is at least 0.1 times the piston diameter, and at most 0.4 times the piston diameter.

To attain optimum guiding of the flow it is of further advantage if the guiding rib has the greatest possible height, i.e., at least in parts, which height is defined by the contour of the roof of the combustion chamber when the piston is in upper dead center, and by the necessary valve clearance. It is preferable that the region of the greatest height be in the area of the cylinder center plane normal to the crankshaft axis.

An optimum flow form is attained if the nozzle opening of the injection device is located on the exhaust side, the radial distance from the cylinder axis being not more than about 0.2 times the piston diameter.

The symmetry axis of the injection jet produced by the injection device encloses an angle with the longitudinal center plane of not more than 30° and is directed towards the area of the cylinder center, as seen in the direction of the cylinder axis. It may further be provided that the conical injection jet produced by the injection device have a cone angle of at least 60° and at most 120°, i.e., preferably 90°.

It is furthermore provided preferably that the ignition source be positioned on the intake side, the radial distance from the longitudinal center plane being at most 0.2 times the piston diameter, and the symmetry axes of the ignition source and the injection jet produced by the injection device enclosing an angle of at least 60° and at most 120°, approximately.

Due to the U-shape of the guiding rib the fuel-air flow is guided in the direction of the ignition source. It is of advantage if the guiding rib, as seen in the direction of the cylinder axis, has a curvature radius of 0.2 to 0.6 times the piston diameter in the area of the cylinder center plane. The guiding rib is preferably positioned on the intake side, i.e., at least predominantly.

To obtain good flow guidance of the fuel-air spray the guiding rib preferably extends into the area of the longitudinal center plane of the engine.

It may further be provided that the guiding rib is symmetrical to the cylinder center plane.

BRIEF DESCRIPTION OF THE DRAWINGS

The invention will be further described with reference to the accompanying drawings, in which.

Parts of the same functions have the same reference numbers in all variants.

DESCRIPTION OF THE PREFERRED EMBODIMENTS

Figure 1:
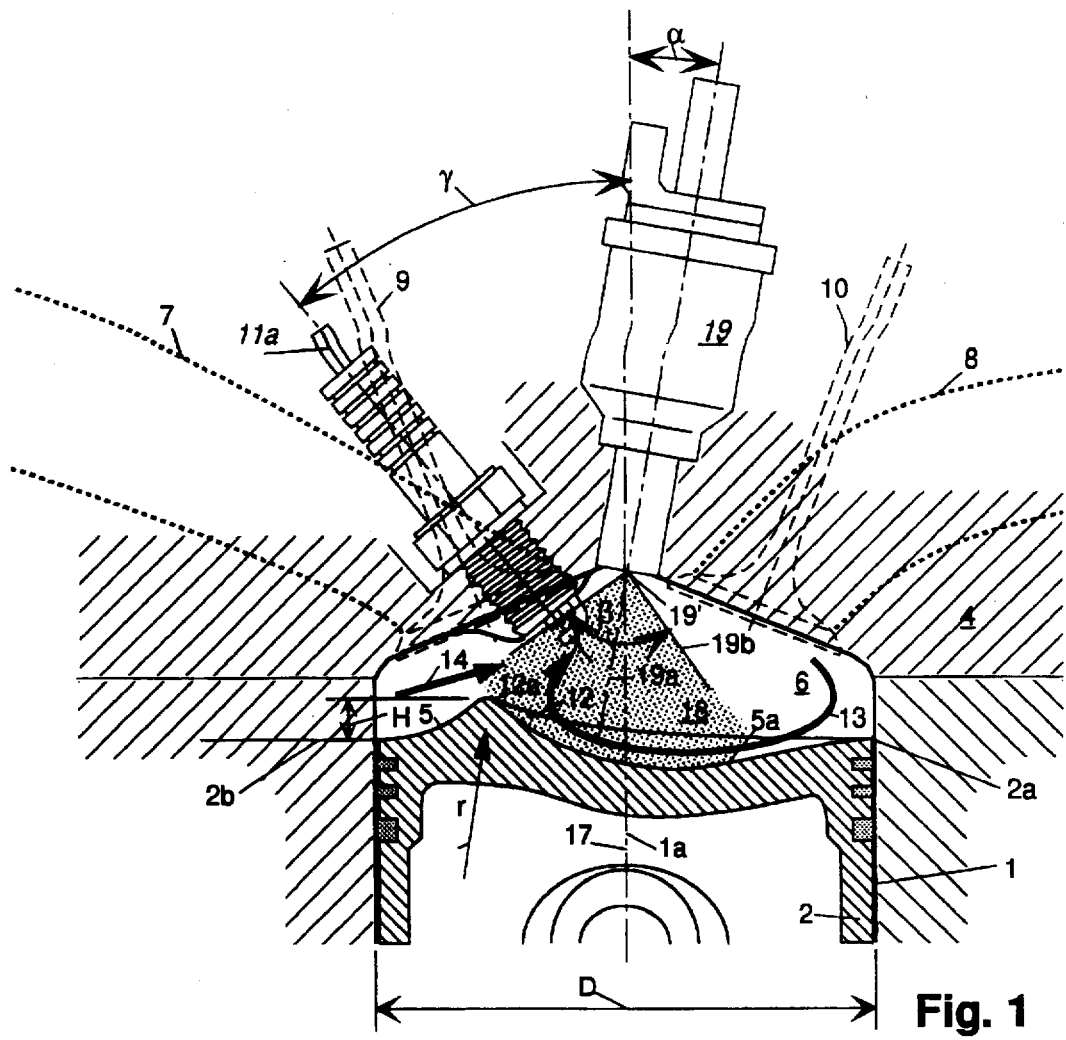
FIG. 1 is a longitudinal section through a cylinder of an internal combustion engine in a variant of the invention, along line I—I in FIG. 2.

In a cylinder 1 of an internal combustion engine a reciprocating piston 2 is positioned so as to slide in longitudinal direction. The roof-shaped top 3 of the combustion chamber in the cylinder head 4 und the piston top face 5 of piston 2 form a combustion chamber 6 into which open two intake ports 7 and two exhaust ports 8, for example, which are indicated by dotted lines in FIG. 1. Corresponding intake and exhaust valves, which are in inclined position and are indicated by dashed lines, bear the reference numbers 9 and 10. 11 refers to a centrally positioned ignition source formed by a spark plug, which is located between two inlet openings 7'. Near the cylinder center the nozzle opening 19' of an injection device 19 is located for direct fuel injection into the combustion chamber 6.

Figure 2:
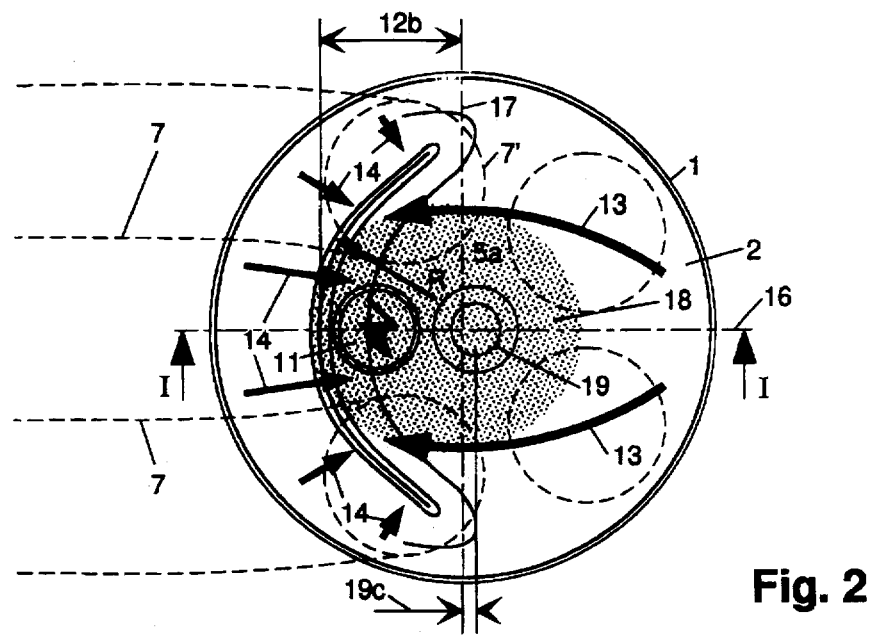
FIG. 2 shows the same variant during fuel injection, in a view in the direction of the cylinder axis.

On the piston top face 5 the piston 2 is provided with a U-shaped guiding rib 12 which influences the tumble flow indicated by arrows 13 in FIGS. 1 and 2 inside the cylinder, in order to optimize the combustion process.

The U-shaped guiding rib 12 (as seen in plan view) is essentially positioned below the intake valves 9 of the internal combustion engine on the piston top 5. The guiding rib 12 has its greatest distance from the cylinder axis 1a in the cylinder center plane 16 containing the cylinder axis 1a and running normal to the crankshaft axis 15, and extends towards the exhaust side of the combustion chamber 6 in a curved shape on both sides of the cylinder center plane 16. The height H above a reference plane 2b defined by the outer edge 2a of the piston preferably assumes a maximum value in the area of the cylinder center plane 16, which maximum is limited by the contour of the roof 3 when the piston 2 is in upper dead center, and by the necessary clearance of the valves 9, 10.

The piston top face 5 extends towards the upper edge 2a of the piston with a continuously rounded and concave contour on either side of the upper edge 12a of the guiding rib, where the area 5a, in particular the part inside the "U", may be located, at least partly, below the reference plane 2b defined by the outer edge 2a of the piston.

The injection device 19 may be slightly shifted towards the exhaust side near the cylinder axis 1a, at an inclined position relative to the exhaust side, whereas the ignition source 11 is shifted and inclined towards the intake side, such that a more or less right angle ±30° forms between the symmetry axes 11a and 19a of injection device 19 and ignition source 11. In this way the spark is positioned closely to the guiding rib 12. Corresponding to the angle of the nozzle the injection jet 19b enters the combustion chamber 6 at an angle slightly inclined towards the intake side, hitting the piston top face 5a inside the U-shaped guiding rib 12. The tumble flow 13 accelerated during the compression phase, is characterized by a high transverse flow velocity near the piston top face 5a in the impact area of the injection jet 19b, thereby improving evaporation of the wall film and facilitating fuel advance along the piston top 5a towards the ignition source 11.

The upper edge 12a of the guiding rib 12 preferably has a curvature radius r small enough to ensure flow separation of the tumble flow 13 carrying the fuel-air spraycloud 18, which will result in an upwards direction of the flow in the central area of the cylinder 1. In the direction of the cylinder axis 1a, the guiding rib 12 exhibits a curvature radius R in the area of the cylinder center plane 18 which is about 0.2 to 0.6 times the piston diameter D. On the intake side a compression swirl 14 is formed by the piston 2 approaching the roof 3 of the combustion chamber in upper dead center, which will help to maintain the compact shape of the fuel-air spraycloud 18. The symmetry axis 19b of the injection jet 19 encloses an angle $\alpha$ with the longitudinal center plane 17 of not more than 30°. The symmetry axis 19a is directed towards the central area of the cylinder.

The nozzle opening 19' of the injection device 19 has a distance 19c from the cylinder axis 1a, which is at most 0.2 times the piston diameter D.

The ignition source 11 is positioned on the intake side, at a distance 12b from the longitudinal center plane 17, which is at most 0.2 times the piston diameter D. The symmetry axis 11a of the ignition source 11 and the symmetry axis 19a of the injection device 19 are positioned relative to each other at an angle gamma of 60°–120°. The cone angle $\beta$ of the injection jet 19b of the injection device 19 is approximately 90°. FIG. 1 shows quite clearly that the fuel-air spraycloud 18 is guided towards the ignition source 11 by flows 13 and 14.

Figure 3:
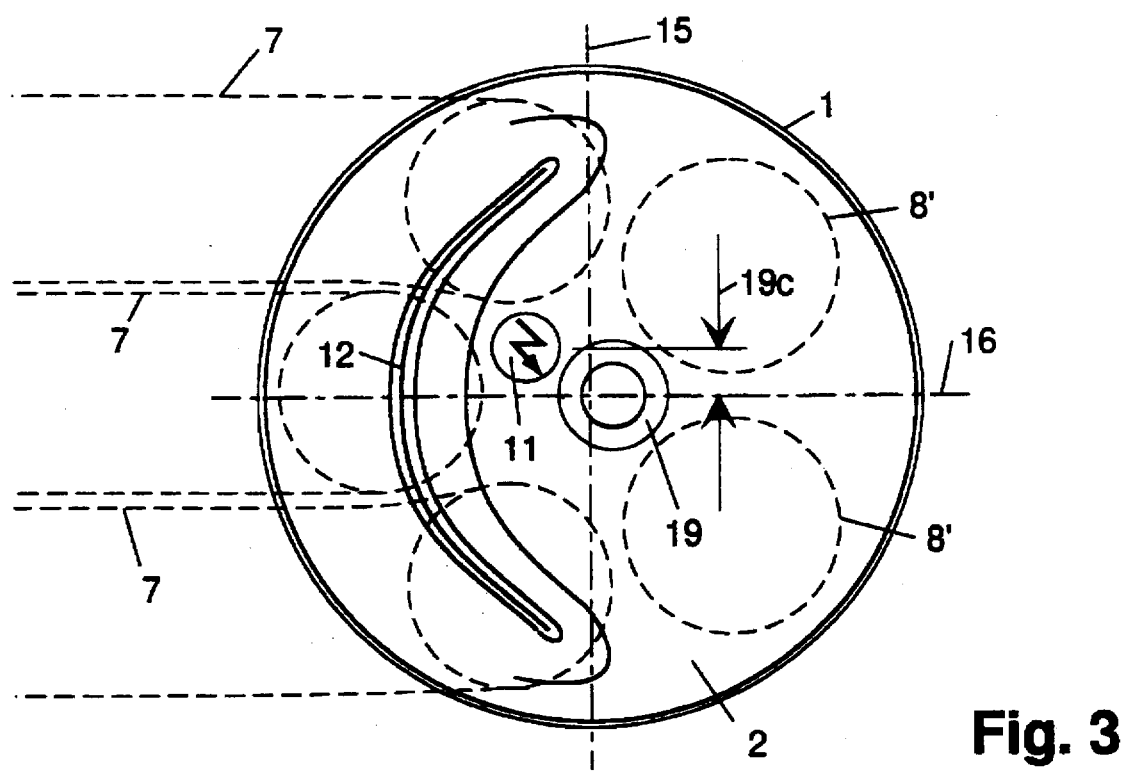
FIG. 3 shows a second variant of the invention, in an internal combustion engine with three intake valves.

The type of piston described by the invention may also be used in internal combustion engines with more than two intake valves 9, as is shown in FIG. 3. In such instances the ignition source 11 is asymmetrically positioned at a distance 11b from the cylinder center plane 16, in order to best utilize the available space without unduly reducing valve diameters.

We claim:

1. A four-stroke internal combustion engine with spark ignition, comprising:

an injection device located in a cylinder head for direct injection of a fuel into a combustion chamber, with a reciprocating piston per cylinder, and a roof-shaped combustion chamber top with two or more intake valves as well as intake ports generating a tumble flow in the combustion chamber and arranged on one side of a longitudinal center plane defined by a crankshaft axis and a cylinder axis, as well as an ignition source located in an area of a cylinder center, wherein the piston is provided on its top face next to the combustion chamber with a flow guiding rib which is essentially U-shaped in plan view, said "U" opening towards an exhaust side of the combustion chamber, and a top face of the piston assuming a continuously curved, concave shape between the guiding rib and an outer edge of the piston, and fuel injection taking place into a concave area inside the "U", and a nozzle opening of the fuel injection device being positioned in an area of the longitudinal center plane of the engine.

2. A four-stroke internal combustion engine as claimed in claim 1, wherein the piston top face is partly situated below a reference plane through the outer piston edge, i.e., on a crankshaft side of said plane.

3. A four-stroke internal combustion engine as claimed in claim 1, wherein the guiding rib is provided with a rounded upper edge, whose curved part smoothly joins with the concave top face of the piston.

4. A four-stroke internal combustion engine as claimed in claim 3, wherein the radius of the rounded part of the guiding rib amounts to 1 to 3 mm.

5. A four-stroke internal combustion engine as claimed in claim 3, wherein the radius of the rounded part of the guiding rib assumes its smallest value in an area of a cylinder center plane normal to the crankshaft axis.

6. A four-stroke internal combustion engine as claimed in claim 1, wherein the largest distance between guiding rib and longitudinal center plane, as measured normally to the longitudinal center plane, is at least 0.1 times the piston diameter, and at most 0.4 times the piston diameter, approximately.

7. A four-stroke internal combustion engine as claimed in claim 1, wherein the guiding rib has the greatest possible height, i.e., at least in parts, which height is defined by the contour of the roof of the combustion chamber when the piston is in upper dead center, and by the necessary clearance of the valves.

8. A four-stroke internal combustion engine as claimed in claim 7, wherein the region of the greatest height is in the area of the cylinder center plane normal to the crankshaft axis.

9. A four-stroke internal combustion engine as claimed in claim 1, wherein a nozzle opening of the injection device is located on an exhaust side, a radial distance from the cylinder axis being not more than about 0.2 times the piston diameter.

10. A four-stroke internal combustion engine as claimed in claim 1, wherein a symmetry axis of an injection jet produced by the injection device encloses an angle with the longitudinal center plane of not more than 30° and is directed towards the area of the cylinder center, as seen in the direction of the cylinder axis.

11. A four-stroke internal combustion engine as claimed in claim 1, wherein the conical injection jet produced by the injection device has a cone angle of at least 60° and at most 120°.

12. A four-stroke internal combustion engine as claimed in claim 11, wherein the conical injection jet produced by the injection device has a cone angle of 90°.

13. A four-stroke internal combustion engine as claimed in claim 1, wherein an ignition source is positioned on an intake side, a radial distance from the longitudinal center plane being at most 0.2 times the piston diameter.

14. A four-stroke internal combustion engine as claimed in claim 1, wherein the symmetry axes of an ignition source and an injection jet produced by the injection device enclose an angle of at least 60° and at most 120°, approximately.

15. A four-stroke internal combustion engine as claimed in claim 1, wherein the guiding rib, as seen in the direction of the cylinder axis, has a curvature radius of 0.2 to 0.6 times the piston diameter in the area of the cylinder center plane.

16. A four-stroke internal combustion engine as claimed in claim 1, wherein the guiding rib is positioned on the intake side, i.e., at least predominantly.

17. A four-stroke internal combustion engine as claimed in claim 1, wherein the ends of the guiding rib are approximately positioned in the area of the longitudinal center plane of the engine.

18. A four-stroke internal combustion engine as claimed in claim 1, wherein the guiding rib is symmetrical to the cylinder center plane.

* * * * *

UNITED STATES PATENT AND TRADEMARK OFFICE
CERTIFICATE OF CORRECTION

PATENT NO. : 5,727,520
DATED : March 17, 1998
INVENTOR(S) : WIRTH et al.

It is certified that error appears in the above-indentified patent and that said Letters Patent is hereby corrected as shown below:

Title page
In the heading, correct as follows:

[75] Inventors: Martin Wirth, Hitzendorf;
Walter Piock, Hitzendorf;
Frank Mundorff, Graz, all of Austria Signed and Sealed this Thirtieth Day of June, 1998

Attest:

BRUCE LEHMAN

*Attesting Officer*  *Commissioner of Patents and Trademarks*